United States Patent
Shepelev et al.

(10) Patent No.: US 10,852,887 B2
(45) Date of Patent: Dec. 1, 2020

(54) DISPLAY DEVICE HAVING REDUCED INTERFERENCE

(71) Applicant: SYNAPTICS INCORPORATED, San Jose, CA (US)

(72) Inventors: Petr Shepelev, Campbell, CA (US); Tetsuo Tanemura, Tokyo (JP); Takayuki Noto, Tokyo (JP)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/266,492

(22) Filed: Feb. 4, 2019

(65) Prior Publication Data
US 2020/0201474 A1  Jun. 25, 2020

Related U.S. Application Data

(60) Provisional application No. 62/784,004, filed on Dec. 21, 2018.

(51) Int. Cl.
| | |
|---|---|
| *G06F 3/041* | (2006.01) |
| *G06F 3/045* | (2006.01) |
| *G06F 3/044* | (2006.01) |
| *G06F 3/046* | (2006.01) |

(52) U.S. Cl.
CPC ............ *G06F 3/0418* (2013.01); *G06F 3/044* (2013.01); *G06F 3/045* (2013.01); *G06F 3/046* (2013.01); *G06F 3/0412* (2013.01)

(58) Field of Classification Search
CPC ..................................................... G06F 3/0418
USPC ........................................................... 345/173
See application file for complete search history.

(56) References Cited

U.S. PATENT DOCUMENTS

| | | | |
|---|---|---|---|
| 2005/0001808 A1* | 1/2005 | Lee .................... | G09G 3/3655 345/96 |
| 2011/0249210 A1* | 10/2011 | Yun ................... | G02F 1/134363 349/41 |
| 2015/0220206 A1 | 8/2015 | Knausz et al. | |
| 2015/0309612 A1 | 10/2015 | Morein et al. | |

* cited by examiner

*Primary Examiner* — Long D Pham
(74) *Attorney, Agent, or Firm* — Patterson + Sheridan, LLP

(57) ABSTRACT

A system and method for reducing electromagnetic interference of a display device. The display device may have a plurality of gate electrodes and a plurality of common electrodes. Further, the display device includes a processing system that is configured to drive a first gate electrode of a plurality of gate electrodes of the display device with a first gate select signal to select first subpixels for updating during a first period. The processing system further comprises driving a first common electrode proximate the first gate electrode with a reference signal during the first period. Further, the processing system is configured to drive a second common electrode with a first interference reduction signal during the first period to reduce the electromagnetic interference of the display device.

17 Claims, 12 Drawing Sheets

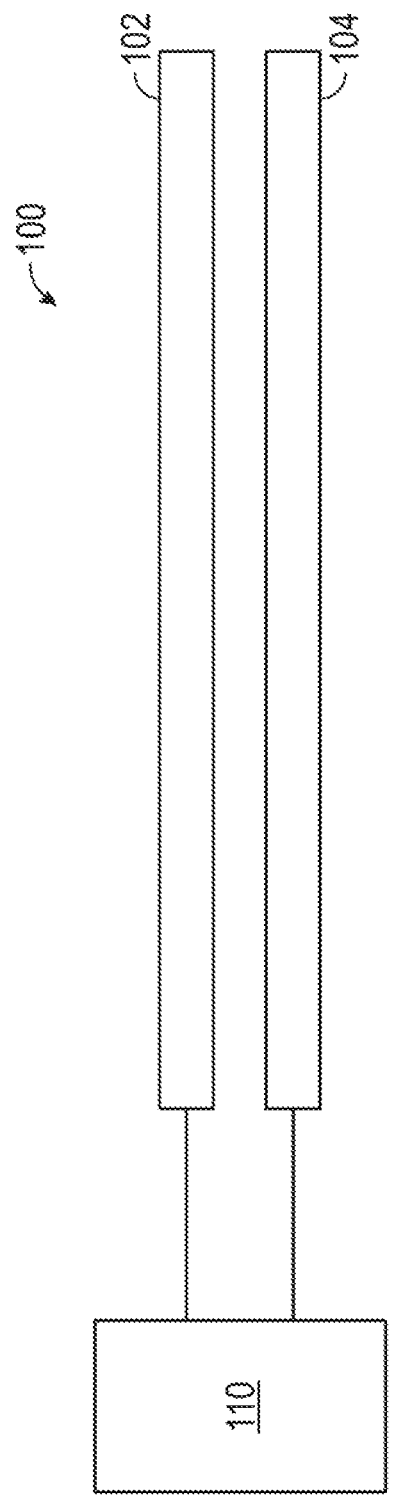

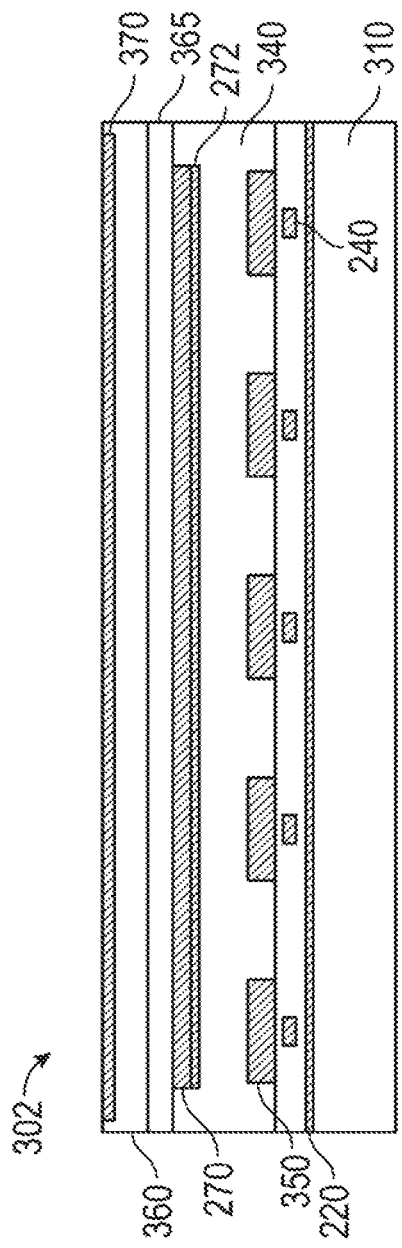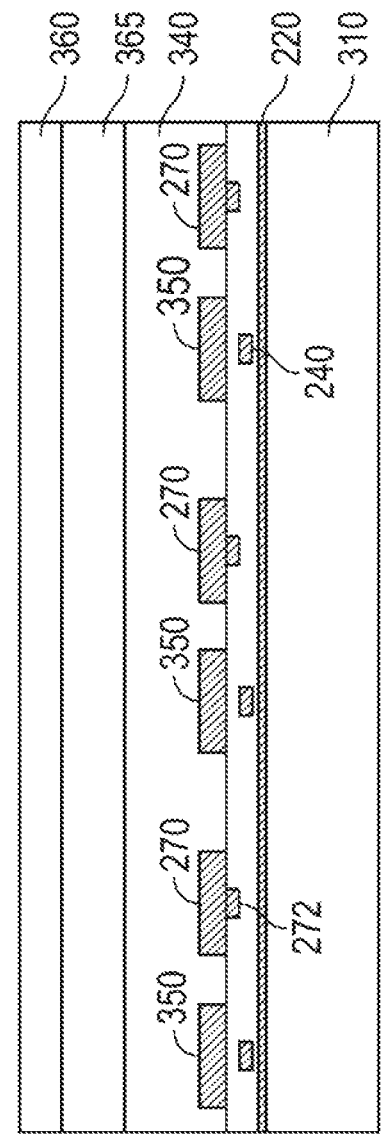
FIG. 3
FIG. 4

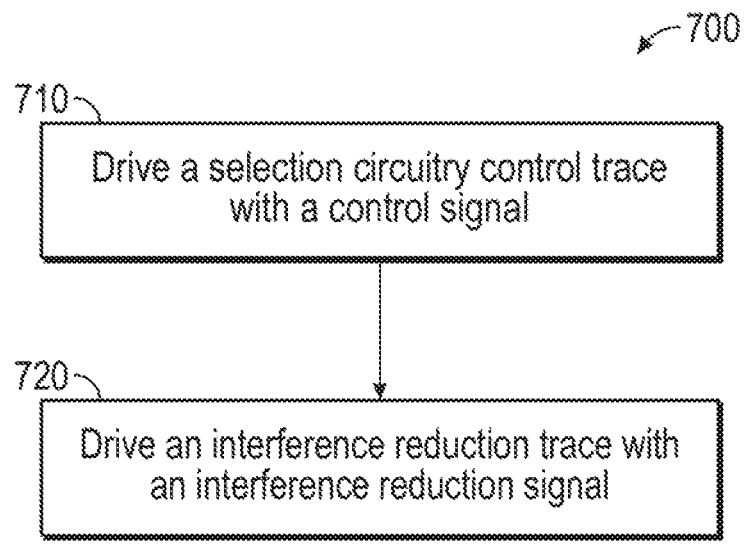
FIG. 7
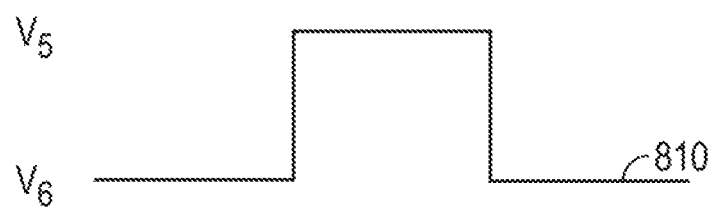
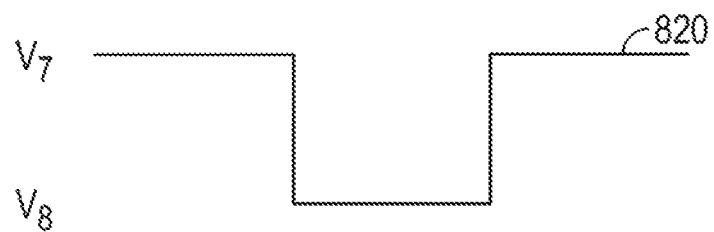
FIG. 8

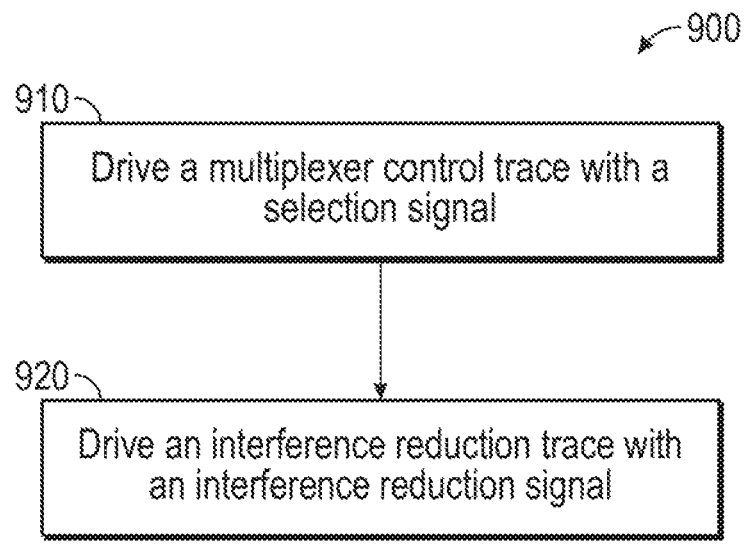
FIG. 9
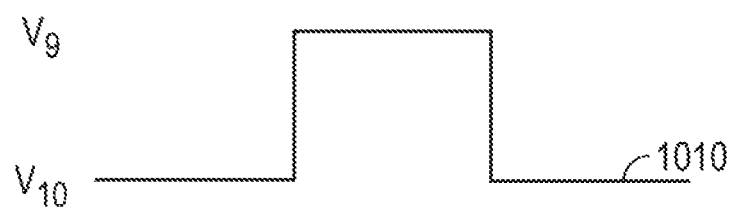
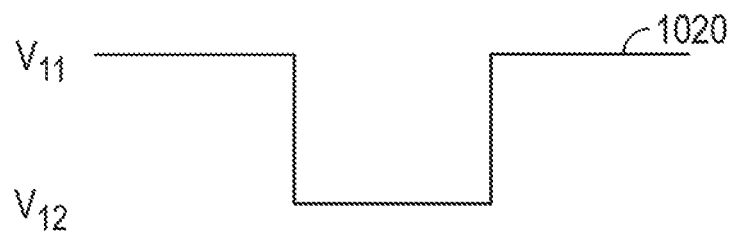
FIG. 10

DISPLAY DEVICE HAVING REDUCED INTERFERENCE

CROSS-REFERENCE TO RELATED APPLICATIONS

This application claims priority to U.S. Provisional Patent Application Ser. No. 62/784,004, filed Dec. 21, 2018 entitled "DISPLAY DEVICE HAVING REDUCED INTERFERENCE" which is incorporated by reference herein in its entirety.

BACKGROUND

Field

Disclosures herein generally relate to electronic devices, and more specifically, to reducing interference emitted by electronic devices.

Description of the Related Art

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also often be used in smaller computing systems, such as touch screens integrated in cellular phones or automobiles.

SUMMARY

In one embodiment, a method for reducing electromagnetic interference of a display comprises driving a first gate electrode of a plurality of gate electrodes of the display device with a first gate select signal to select first subpixels of a plurality of subpixels for updating during a first period. The method further comprises driving a first common electrode of a plurality of common electrodes with a reference signal during the first period. The first common electrode is proximate the first gate electrode. The method further comprises driving a second common electrode of the plurality of common electrodes with a first interference reduction signal during the first period. The first interference reduction signal comprising a polarity opposite a polarity of the of the first gate select signal.

In one embodiment, a display device comprises a plurality of gate electrodes, a plurality of common electrodes, a plurality of subpixels coupled to the plurality of gate electrodes, and a processing system. The processing system is configured to drive a first gate electrode of the plurality of gate electrodes with a first gate select signal to select first subpixels of the plurality of subpixels for updating during a first period, drive a first common electrode of the plurality of common electrodes with a reference signal during the first period, and drive a second common electrode of the plurality of common electrodes with a first interference reduction signal during the first period. The first common electrode is proximate the first gate electrode. The first interference reduction signal comprises a polarity opposite a polarity of the first gate select signal.

In one embodiment, a display driver for a display device comprises control circuitry, and display driver circuitry. The control circuitry is configured to output a control signal to instruct selection circuitry to drive a first gate electrode of a plurality of gate electrodes of the display device with a first gate select signal to select first subpixels of the display device for updating during a first period. The display driver circuitry is configured to drive a first common electrode of a plurality of common electrodes of the display device with a reference signal during the first period, and drive a second common electrode of the plurality of common electrodes with a first interference reduction signal during the first period. The first common electrode is proximate the first gate electrode and the first interference reduction signal comprises a polarity opposite a polarity of first gate select signal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

FIG. 1 illustrates a schematic block diagram of an electronic device, according to one or more embodiment.

FIGS. 3 and 4 are partial side views of a display device, according to one or more embodiments.

FIG. 7 illustrates a method for reducing interference emitted by a display device, according to one or more embodiments.

FIG. 8 illustrates traces of signals driven on to a display device to reduce emitted interference, according to one or more embodiments.

FIG. 9 illustrates a method for reducing interference emitted by a display device, according to one or more embodiments.

FIG. 10 illustrates traces of signals driven on to a display device to reduce emitted interference, according to one or more embodiments.

Figure 2A:
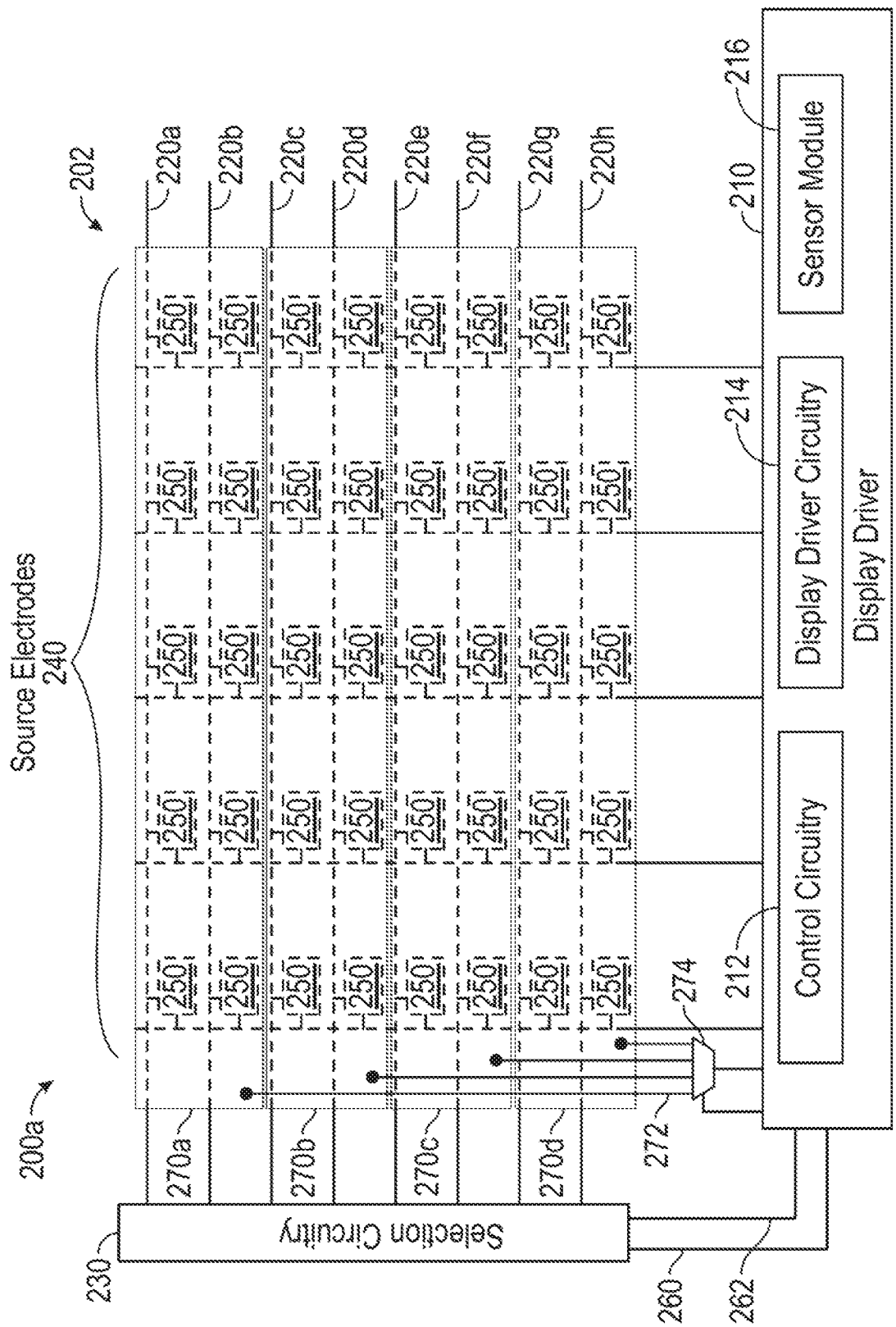
FIGS. 2A, 2B, 2C and 2D are schematic block diagrams of a portion of a display device, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

FIG. 1 illustrates an electronic device 100 according to one or more embodiments. In one or more embodiments, the electronic device 100 may be a display device. For example, the electronic device 100 may be a liquid crystal display (LCD) device, or an organic light emitting diode (OLED) display device, amongst others. The electronic device 100 may include a conductor 102, an interference reduction conductor 104 and a driver 110.

The conductor 102 may be a display electrode. For example, the conductor 102 may be any one of a gate electrode, a selection circuitry control trace, a multiplexer (MUX) control trace, and an emission control electrode, amongst others. Further, the electrode 102 may be any electrode of the electronic device 100 that may be driven with a varying voltage signal. The varying voltage signal may be a display update signal. For example, the varying voltage signal may be any one of a gate select signal, a control signal, a selection signal, and an emission control signal, amongst others.

The interference reduction conductor 104 may be any conductive element configured to be driven with an interference reduction signal. In various embodiments, the interference reduction conductor 104 may be any electrode or conductive trace within the electronic device 100 configured to be driven with an interference reduction signal. For example, the interference reduction conductor 104 may be a common electrode of a display device or an interference reduction trace of a display device, amongst others.

In one or more embodiments, driving the interference reduction conductor 104 with an interference reduction signal reduces interference generated when the conductor 102 is driven with a varying voltage signal, as a polarity of the interference reduction signal is opposite to that of the varying voltage signal. Further, the interference reduction signal and the varying voltage signal may differ in one or more of shape, peak-to-peak amplitude, and/or phase.

The driver 110 may be coupled to the conductor 102 and the interference reduction conductor 104. The driver 110 may be configured to drive the conductor 102 with a varying voltage signal and drive the interference reduction conductor 104 with an interference reduction signal to reduce interference generated when driving the conductor 102. In one or more embodiments, the driver 110 may be a display driver and include circuitry to drive the conductor 102 with a display update signal, and the interference reduction conductor 104 with an interference reduction signal.

FIG. 2A illustrates a display device 200a, according to one or more embodiments. As illustrated, the display device 200a includes a display panel 202a, a display driver 210, and selection circuitry 230. The display device 200a further includes a selection circuitry control trace 260, a MUX 274, and an interference reduction trace 262.

The display panel 202a includes gate electrodes 220, source electrodes 240, subpixels 250 and common electrodes 270 (common electrodes 270a-270d). The display driver 210 is coupled with the common electrodes 270 of the display panel 202a via traces 272, and the multiplexer (MUX) 274. Further, the display driver 210 is coupled with the source electrodes 240 of the display panel 202a, and with the selection circuitry 230 via the selection circuitry control trace 260.

In one embodiment, the gate electrodes 220 are coupled to one or more subpixels 250 arranged in a common row. The gate electrodes 220 may be driven with gate select signals to select the subpixels 250 for updating. For example, a gate electrode 220a may be driven with a gate select signal to select the subpixels 250 coupled to the gate electrode 220a for updating. In various embodiments, each gate electrode 220 is coupled to a respective row of the subpixels 250. In one or more embodiments, at least two gate electrodes 220 are coupled to the subpixels 250 of a common row. In one embodiment, each row of subpixels 250 may be referred to as a display line. Further, the period of time corresponding to when each subpixel 250 of a display line is updated may be referred to a display line update period.

The source electrodes 240 may be coupled to a column of subpixels 250 and configured to drive a subpixel data signal onto each of the subpixels 250 to update the subpixels 250. For example, a subpixel 250 that has been selected for updating by the selection circuitry 230 may be driven with a subpixel data signal by the display driver circuitry 214 via a corresponding one of the source electrodes 240.

In the embodiment of FIG. 2A, the common electrodes 270 are arranged such that they overlap at least two display lines and span multiple columns of subpixels 250. In other embodiments, the common electrodes 270 may overlap one or more display lines. In one embodiment, each common electrode 270 spans over each subpixel 250 of an associated display line.

In one or more embodiments, each subpixel 250 may include a subpixel electrode and subpixel circuitry comprising one or more transistors configured to control the activation and deactivation of each subpixel. The subpixel circuitry for each subpixel 250 may be coupled to a corresponding gate electrode 220, and a corresponding source electrode 240. In one embodiment, the subpixel circuitry couples a corresponding subpixel 250 with a subpixel data signal on a corresponding source electrode 240.

In one or more embodiments, the display device 200a may be a LCD device. In such embodiments, each of the subpixels 250 of the display device 200a includes a subpixel electrode. Further, the common electrodes 270 may be common voltage (Vcom) electrodes. In other embodiments, the display device 200a is an OLED display device. In such embodiments, the subpixels 250 may include anode electrodes and the common electrodes 270 may be operate as cathode electrodes.

The display driver 210 may include control circuitry 212 and display driver circuitry 214. In one embodiment, the display driver 210 is configured to receive display data from the host device for display updating. The display driver 210 may process the display data to generate subpixel update signals that are driven onto the source electrodes 240 to update the subpixels 250.

In one embodiment, the display driver circuitry 214 drives the source electrodes 240 with subpixel update signals to update the subpixels 250 selected by the selection circuitry 230. For example, driving the subpixels 250 with the subpixel update drives the electrodes of the subpixels 250 to a particular voltage level. Further, in one or more embodiments, the display driver circuitry 214 is configured to drive a first one or more of the common electrodes 270 with a reference voltage (or common voltage), and a second one or more common electrodes 270 with a corresponding one or more interference reduction signals to reduce interference generated when driving the gate electrodes 220 with the gate select signals.

In one or more embodiments, the display driver 210 individually drives each common electrode 270. For example, the common electrode 270a may be driven for display updating, while the common electrode 270d is driven for interference mitigation. The display driver 210 may be coupled to the common electrodes 270 via the MUX 274, and the MUX 274 may be configured to control which common electrode is driven for display updating and which common electrode is driven for interference mitigation. The MUX 274 may be internal to the display driver 210 or external to the display driver 210. Further, while FIG. 1 illustrates one MUX, in other embodiments, two or more MUXs may be utilized. Further, each MUX may be coupled to different groups of the common electrodes 270. In one embodiment, two or more MUXs may be coupled to a common group of the common electrodes 270. In such an embodiment, a first MUX may select a first common electrode to be driven with a reference voltage and a second MUX may select a second common electrode to be drive with an interference reduction signal.

In one embodiment, driving a common electrode 270 for display updating includes driving the common electrode with a reference voltage (e.g., a common voltage). The reference voltage may be a substantially constant voltage. Further, driving a common electrode for interference mitigation (or to reduce interference) may include driving a common electrode 270 with an interference reduction signal.

The display driver 210 may be configured to communicate with the selection circuitry 230 via the selection circuitry control trace 260. In one embodiment, the control circuitry 212 communicates a control signal to the selection circuitry 230. The control signal may indicate which gate electrode 220 to select for display updating. In one embodiment, the control signal may indicate an order to select the gate electrodes 220 for updating. In one or more embodiments, the control signal is a clock signal, and the selection circuitry 230 selects the gate electrodes 220 for display updating based on rising edges of the clock signal.

An interference reduction trace 262 may be coupled to the display driver 210 and disposed proximate the selection circuitry control trace 260. The display driver 210 may drive an interference reduction signal on the interference reduction trace 262 to reduce interference generated when driving a control signal on the selection circuitry control trace 260. In one embodiment, the control circuitry 212 drives the interference reduction signal onto the interference reduction trace 262.

In one or more embodiments, the interference reduction trace 262 is coupled between the display driver 210 and the selection circuitry 230. Alternatively, the interference reduction trace 262 may be coupled between the display driver 210 and an electrical load. The electrical load may be a resistance-capacitance (RC) load, and the RC value of the electrical load coupled to the interference reduction trace 262 may be substantially similar to the RC value of the selection circuitry 230.

In various embodiments, the RC time constant of the interference reduction trace 262 is substantially similar to the RC time constant of the selection circuitry control trace 260. Further, the length, width, and/or height of the interference reduction trace 262 may be substantially similar to the length, width, and/or height of the selection circuitry control trace 260. In one or more embodiments, the interference reduction trace 262 and the selection circuitry control trace 260 are comprised of similar materials.

The selection circuitry 230 may be configured to drive a gate select signal on the gate electrodes 220 to select (active) and deselect (deactivate) the subpixels 250 for updating. The gate select signal may include a voltage transition between a gate high signal, or $V_{GH}$, and a gate low signal, or $V_{GL}$. In one or more embodiments, $V_{GH}$ and $V_{GL}$ correspond to the turn-on and turn-off voltages of the select transistors of the subpixels 250. The select transistors are configured to control activation and deactivation of the subpixels 250. In one embodiment, when the gate select signal transitions from $V_{GL}$ to $V_{GH}$, a gate electrode may be selected for updating, and when the gate select signal transitions from $V_{GH}$ to $V_{GL}$, the gate electrode may be deselected for updating. Alternatively, in various embodiments, $V_{GH}$ may correspond to a turn-off voltage of the select transistors and $V_{GL}$ may correspond to a turn-on voltage of the select transistors. In such embodiments, the gate select signal may transition from $V_{GH}$ to $V_{GL}$ to select a gate electrode for updating and from $V_{GL}$ to $V_{GH}$ for to deselect the gate electrode for updating. In one embodiment, $V_{GH}$ is a positive voltage and $V_{GL}$ is a negative voltage. For example, $V_{GH}$ may be about 15 V and VGL may be about −10 V. However, in other embodiments, other voltages may be used.

The source electrodes 240 may be driven with corresponding subpixel data signals for updating the selected subpixels 250. In one embodiment, two or more of the source electrodes 240 are simultaneously driven with corresponding subpixel data signals. In one embodiment, the display driver circuitry 214 includes source drivers coupled to and configured to drive the source electrodes 240. In one embodiment, each source driver is coupled to a respective one of the source electrodes 240. In another embodiment, the source drives are coupled to multiplexers (MUXs), and then to the source electrodes 240. For example, as is illustrated in embodiments of FIGS. 2B and 2D, the display driver circuitry 214 is coupled to the source electrodes 240 via MUXs 252. The MUXs 252 control which source electrodes 240 are driven for display updating. The source drivers of the display driver circuitry 214 may include one or more amplifiers and other driver circuitry configured to drive subpixel data signals onto the subpixels 250.

In one or more embodiments, the display driver 210 may additionally include hardware and/or firmware elements configured to receive display data from a host device and process the display data to generate the subpixel data signals. For example, the display driver 210 may include a mobile industry processor interface (MIPI) receiver. Further, the display driver 210 may include a timing control circuitry configured to generate timing signals used for display updating.

In one embodiment, the selection circuitry 230 may be disposed within a common integrated circuit (IC) chip with the display driver 210. In other embodiments, the selection circuitry 230 may be disposed within a first IC chip and the display driver 210 may be disposed within a second IC chip.

Figure 2B:
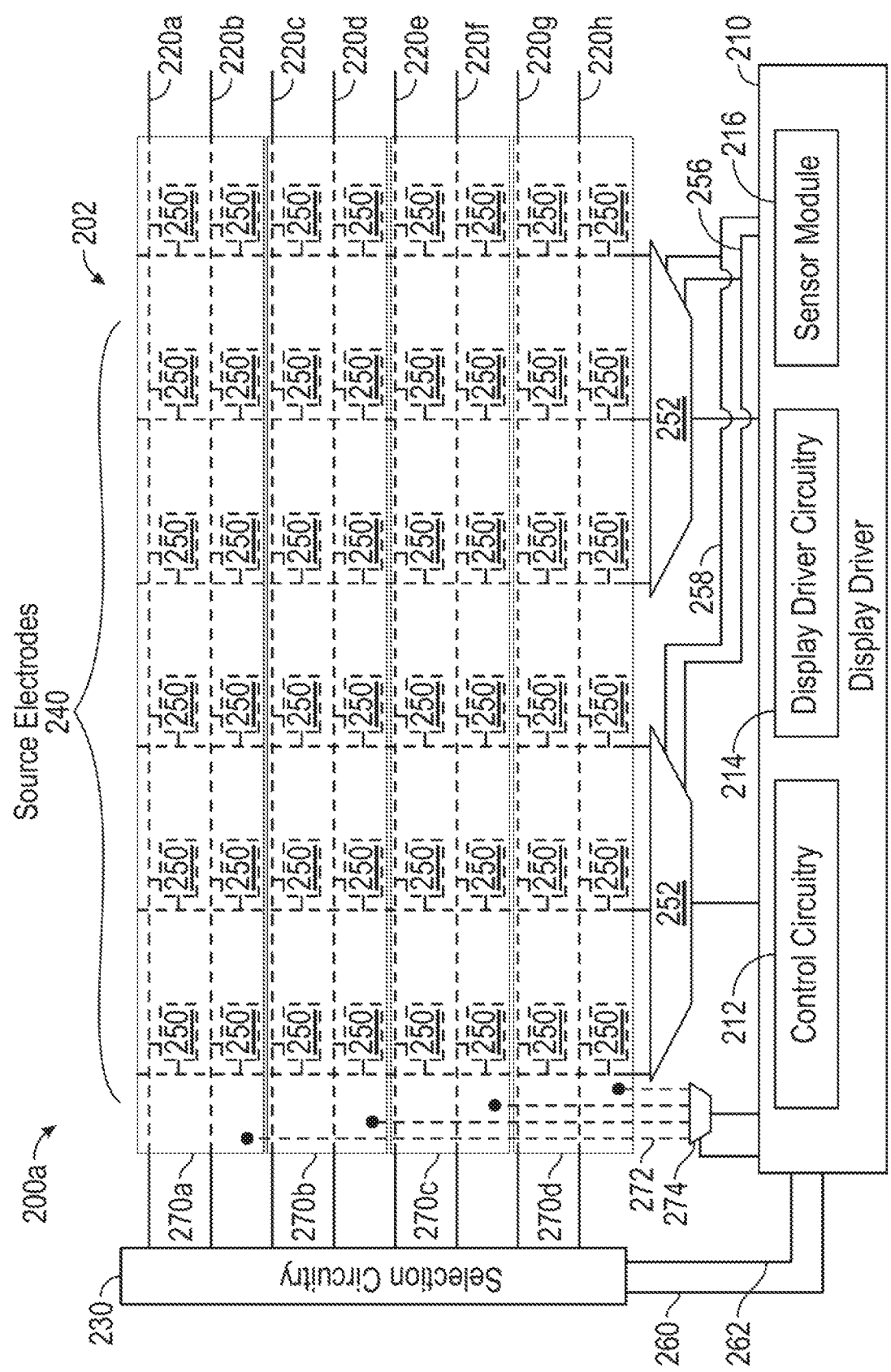

FIG. 2B illustrates a portion of a display device, display device 200b, according to one or more embodiments. The display device 200b is configured similar to the display device 200a; however, the display device 200b includes MUXs 252, a MUX control trace 256 and an interference reduction trace 258. The MUXs 252 couple the display driver 210 with the source electrodes 240. The MUXs 252 may be coupled to two or more source electrodes 240. In one embodiment, each MUX 252 is coupled to at least three source electrodes 240. For example, each MUX 252 may be coupled to a first source electrode coupled to subpixels of a first type, a second source electrode coupled to subpixels of a second type and a third source electrode coupled to subpixels of a third type. The types of subpixels may correspond to different colors of subpixels. For example, the first type may be green subpixels, the second type may be blue subpixels and the third type may red subpixels. In other embodiments, other types of subpixels may be utilized, and each of the MUXs 252 may be coupled to other numbers of subpixels. In various embodiments, the MUXs 252 may be configured as 1:2, 1:3, 1:4, or 1:X, where X is any number greater than 4.

Each MUX 252 is coupled to the display driver 210 via a MUX control trace 256. Two or more of the MUXs 252 may be coupled to a common MUX control trace 256, or each MUX 252 may be coupled to a different MUX control trace 256. The display driver 210 may be configured to drive the MUXs 252 with a selection signal via the MUX control trace 256 to select one of the source electrodes 240 coupled to the MUXs 252 for updating. For example, the display driver circuitry 214 may drive a selection signal onto the MUX control trace 256, and the selection signal may provide an indication as to which source electrode to drive. In one embodiment, the selection signal may be a clock signal having one or more voltage transitions. Further, the MUXs 252 may select and/or deselect different source electrodes 240 based on rising and/or falling edges of the clock signal.

The display device 200b further includes an interference reduction trace 258 disposed proximate the MUX control trace 256. In one embodiment, the display driver 210 is configured to drive an interference reduction signal onto the interference reduction trace 258 to reduce interference generated when driving the selection signals onto the MUX control trace 256. In various embodiments, the RC time constant of the interference reduction trace 258 is substantially similar to the RC time constant of the MUX control trace 256. Further, the length, width, and/or height of the interference reduction trace 258 may be substantially similar to the length, width, and/or height of the MUX control trace 256. In one or more embodiments, the interference reduction trace 258 and the MUX control trace 256 are comprised of similar materials.

The interference reduction trace 258 may be coupled to the display driver 210 and to the MUXs 252. Alternatively, the interference reduction trace 258 may be coupled to the display driver 210 and to one or more electrical loads. The electrical load or loads may have an RC value similar to that of the MUXs 252.

Figure 2C:
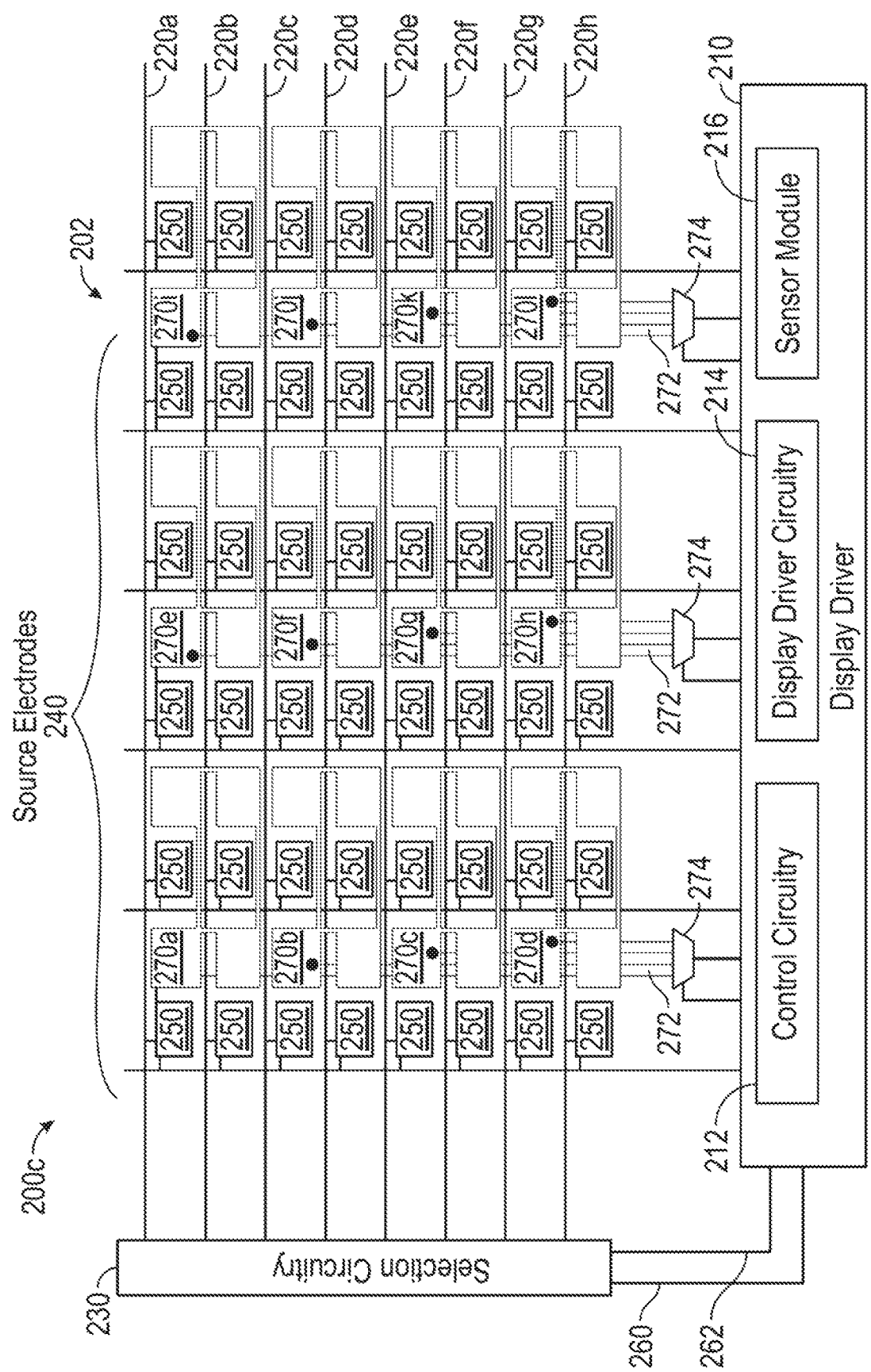
Figure 2D:
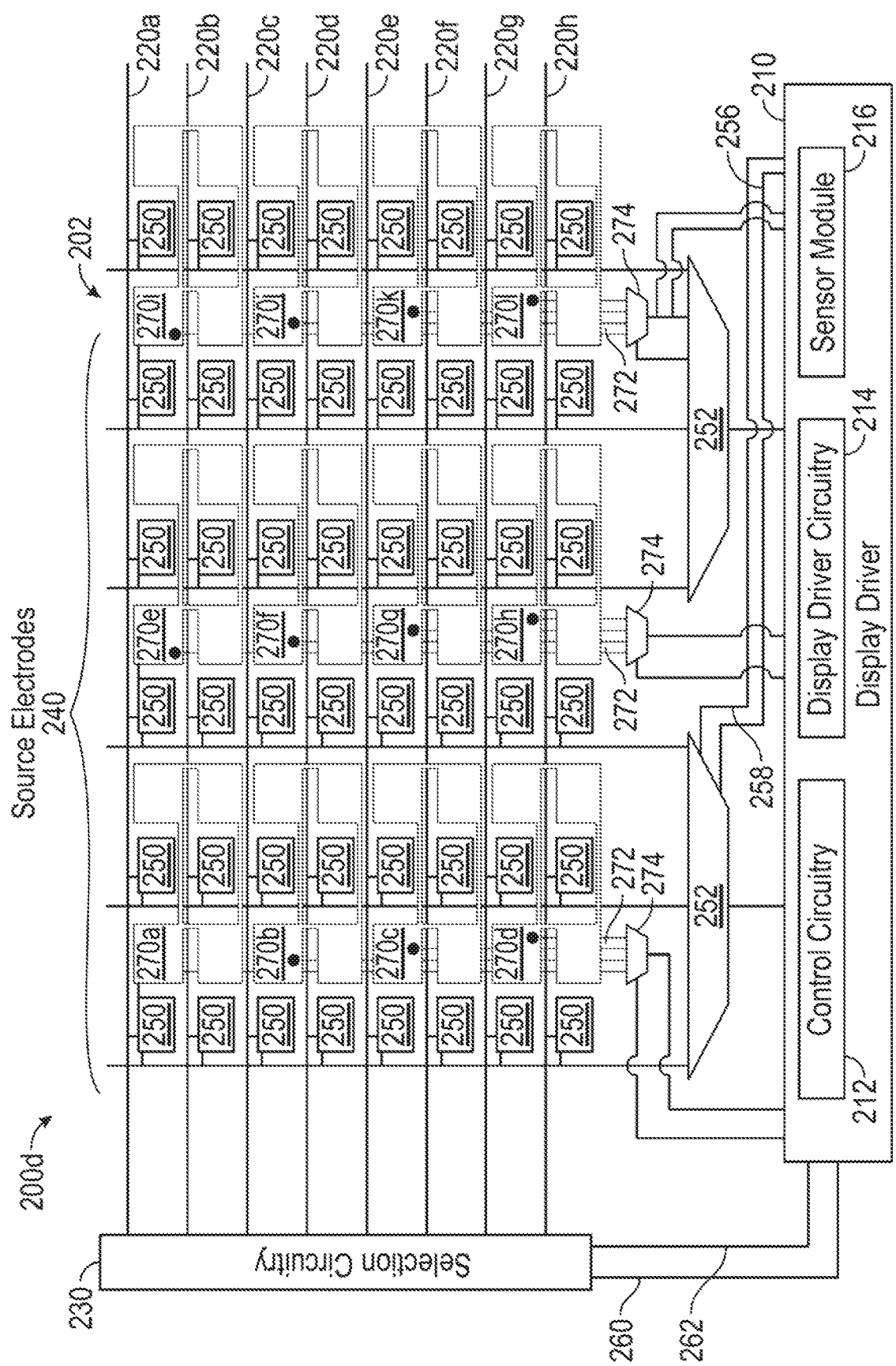

FIGS. 2C and 2D illustrate display devices 200c and 200d, according to one or more embodiments. The embodiments of FIGS. 2C and 2D are similar to the embodiments of FIGS. 2A and 2B. For example, the display devices 200c and 200d of FIGS. 2C and 2D, respectively, each include the display driver 210, the selection circuitry 230, the gate electrodes 220, the source electrodes 240, the selection circuitry control trace 260, and interference reduction trace 262. Each of these elements are described in greater detail above with regard to display devices 200a and 200b of FIGS. 2A and 2B, respectively. In one or more embodiments, the display device 200d includes the MUXs 252, the MUX control trace 256 and the interference reduction trace 258, which are described in greater detail above with regard to display device 200b. However, the common electrodes 270 of the display panels 202c and 202d differ from the common electrodes 270 of the display panels 202a and 2002b. For example, in the embodiments of FIGS. 2C and 2D, each common electrode 270a-270l is smaller in at least one dimension as compared to the common electrodes 270 of FIGS. 2A and 2B. For example, each common electrode 270a-270l is associated with a portion of two display lines and a portion of two subpixel columns, and two or more of the common electrodes 270a-270l are associated with the same display line. In various embodiments, each common electrode 270 may be associated with a portion of more than two display lines and/or a portion of two more subpixel columns. Further, in one embodiment, the common electrodes 270 of FIGS. 2C and 2D span fewer columns of subpixels 250 than that of the common electrodes 270 of FIGS. 2A and 2B. Additionally, in the embodiments of FIGS. 2C and 2D, the common electrodes 270 and the subpixel electrodes of subpixels 250 may be disposed such that they are horizontally separated from each other.

In one embodiment, the common electrodes 270 of FIGS. 2C and 2D are communicatively coupled to the display driver 210 via the traces 272 and the MUXs 274. In one embodiment, the MUXs 274 may be configured to select one or more of the common electrodes 270 to be driven with the reference voltage and one or more of the common electrodes 270 to be driven with the interference reduction signal by the display driver 210. Further, the MUXs 274 may be external to the display driver 210 or internal to the display driver 210. In various embodiments, the MUXs 274 may be omitted and the common electrodes 270 may be coupled directly to the display driver 210.

In one or more embodiments, the number of common electrodes 270 may vary from the embodiments of FIGS. 2A, 2B, 2C and 2D. For example, while the embodiment of FIGS. 2A and 2B illustrate 4 common electrodes, common electrodes 270a-270d, in other embodiments, more than or less than 4 common electrodes may be utilized. Further, while the embodiment of FIGS. 2C and 2D illustrate 12 common electrodes, in other embodiments, more than or less than 12 common electrodes may be utilized. For example, in one or more embodiments, the display device 200 may have hundreds of common electrodes 270. In one embodiment, the common electrodes 270 may be referred to as common electrode segments, and the display devices 200 may be referred to as including a segmented common (or Vcom) electrode or layer.

In various embodiments, driving the common electrodes 270, the interference reduction trace 258, and or the interference reduction trace 262 with interference reduction signals limits interference generated by the display device 200 increasing the applicability of the display device 200. For example, reducing the interference emitted by the display device 200 may increase the number of electronic systems (e.g., personal computing devices, mobile phones, tablets, automobiles, and the like) that the display device 200 may be able to operate within. In various embodiments, driving the common electrodes 270, the interference reduction trace 258, and or the interference reduction trace 262 with interference reduction signals minimizes the interference generated when driving the display device 200 for updating in one or more radio bands. The radio bands may be amplitude modulation (AM) and frequency modulation (FM) radio bands, amongst others.

In one or more embodiments, driving one or more of the common electrodes 270 with an interference reduction signal reduces interference generated when a gate electrode, e.g., the gate electrode 220a, is driven with a gate select signal to change the electrical state of the gate electrode 220a and deselect a corresponding display line. For example, driving the common electrodes 270d with an interference reduction signal reduces interference generated by driving the gate electrodes 220a with gate select signals that may interfere with one or more electronic devices of an automobile. In one embodiment, the interference generated by the voltage transitions of the gate select signals may have a spectrum at high power harmonics, and driving the common electrodes 270 with interference reduction signals reduces interference within the high power harmonics, reducing the interference at one or more radio bands. For example, driving one or more of the common electrodes 270 with an interference reduction signal reduces the amount of interference generated when driving the gate electrodes 220 with gate select signals in one or more of AM and FM radio bands.

In one or more embodiments, interference reduction signals may be driven onto at least one of the common electrodes 270, the interference reduction trace 258 and the interference reduction trace 262, to reduce interference generated when updating the display device 200. For example, one or more of the common electrodes 270 may be driven for interference reduction during a period of time that overlaps with when one or more of the gate electrodes 220 are driven gate select signals. Further, the interference reduction trace 262 may be driven for interference reduction during a period of time that overlaps with when the control signal is driven on the selection circuitry control trace 260, and the interference reduction trace 258 may be driven for interference reduction during a time that overlaps with when a selection signals is driven on the MUX control trace 256.

In various embodiments, the display driver 210 may operate (e.g., drive with interference reduction signals) one or more of the common electrodes 270, the interference reduction trace 258, and the interference reduction trace 262 for interference reduction during overlapping periods of time. In one or more embodiments, the display driver 210 operates two or more of the common electrodes 270, the interference reduction trace 258, and the interference reduction trace 262 for interference reduction during non-overlapping and/or overlapping periods of time.

In one or more embodiments, the common electrodes 270 may be driven for capacitive sensing. In such embodiments, the display driver 210 may include a sensor module 216 that is configured to drive the common electrodes 270 for capacitive sensing. Further, the common electrodes 270 may be referred to as sensor electrodes. In one embodiment, the sensor module 216 comprises circuitry configured to drive a transmitter signal onto first ones of common electrodes 270 and receive resulting signals from other common electrode 270 or receive electrodes, e.g., receiver electrodes 370 of FIG. 3. In another embodiment, the sensor module 216 is configured to drive an absolute capacitive sensing signal onto the common electrodes 270 and receive resulting signals with the common electrodes 270 for absolute capacitive sensing.

In one or more embodiments, "mutual capacitance" (also often referred to as "transcapacitance") sensing methods are based on changes in the capacitive coupling between sensor electrodes. For example, mutual capacitance sensing methods may be based on changes in capacitive couple between common electrodes 270, or between common electrodes 270 and receiver electrodes 370. In various embodiments, an input object near the sensor electrodes alters the electric field between the sensor electrodes, thus changing the measured capacitive coupling. In one embodiment, a transcapacitive sensing method operates by detecting the capacitive coupling between one or more common electrodes 270 (also referred to herein as "transmitter sensor electrodes" or "transmitter electrodes") and one or more other common electrodes 270 or receiver electrodes 370 (also referred to herein as "receiver sensor electrodes" or "receiver electrodes"). Transmitter electrodes may be modulated relative to a reference voltage, e.g., system ground, and/or a receiver electrode to transmit transmitter signals. Receiver electrodes may be held substantially constant relative to the reference voltage or modulated differently than the transmitter electrodes to facilitate receipt of resulting signals. A resulting signal may comprise effect(s) corresponding to one or more transmitter signals, and/or to one or more sources of environmental interference, e.g. other electromagnetic signals. The sensor electrodes may be dedicated transmitter electrodes or receiver electrodes, or may be configured to both transmit and receive. In one or more embodiments, the transmitter signal is modulated and contains one or more bursts over a period of time allocated for input sensing. The transmitter signal may have an amplitude, frequency and voltage which may be changed to obtain more robust location information of the input object in a sensing region.

In one embodiment, "self-capacitance" (also often referred to as "absolute capacitance") sensing methods are based on changes in the capacitive coupling between common electrodes 270 and an input object. In various embodiments, an input object near the common electrodes 270 alters the electric field near the sensor electrodes, thus changing the measured capacitive coupling. In one implementation, an absolute capacitance sensing method operates by modulating the common electrodes 270 with respect to a reference voltage, e.g., system ground, and by detecting the capacitive coupling between the sensor electrodes and input objects. In one embodiment, the sensor module 216 drives an absolute capacitive sensing signal onto the common electrodes 270 to perform absolute capacitive sensing. In one embodiment, the absolute capacitive sensing signal is the same or different from the transmitter signal used in transcapacitance sensing.

In one or more embodiments, the sensor circuitry of the sensor module 216 comprises transmitter circuitry and/or receiver circuitry. The transmitter and/or receiver circuitry may include a plurality of analog front ends (AFEs) and/or one or more drivers.

The sensor module 216 may be selectively coupled to one or more of the common electrodes 270. For example, the sensor module 216 may be coupled to selected portions of the sensor electrodes and operate in either an absolute or transcapacitance sensing mode.

In one or more embodiments, capacitive sensing and display updating occur during at least partially overlapping periods. Display updating may include updating the voltages on each of the subpixels 250 during a display frame. During each display frame, each of display line of the display device may be updated. In one embodiment, a display frame may be updated once every 16 ms or at a display frame rate of 60 Hz. In other embodiments, other display frame rates may be utilized. For example, display frame rates of 48 Hz, 120 Hz, 180 Hz 220 Hz, and 240 Hz, amongst others, may be utilized. Further, in some embodiments, as a common electrode 270 is driven for display updating, the common electrode 270 may also be driven for capacitive sensing. Overlapping capacitive sensing and display updating may include modulating the reference voltage(s) of the display device and/or modulating at least one common electrode 270 for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display line update period. In such an embodiment, the non-display update period may be referred to as a long horizontal blanking period, long h-blanking period or a distributed blanking period. In other embodiments, the non-display update period may comprise horizontal blanking periods and vertical blanking periods. The display driver 210 may be configured to drive sensor electrodes for capacitive sensing during any one or more of or any combination of the different non-display update times.

FIG. 3 is an example partial side view of a display panel 302, according to one or more embodiments. In one embodiment, the display panel 302 includes a substrate 310, the gate electrodes 220, the source electrodes 240, subpixel electrodes 350, the common electrodes 270, the traces 272, liquid crystal material 340, and a lens 360. Further, the display panel 302 may include a color filter glass 365, and one or more polarizers, and other display layers not illustrated. In one embodiment, the gate electrodes 220 and the source electrodes 240 may be disposed within different metal layers, and the position of those metal layers may differ from what is shown in the embodiment of FIG. 3. For example, in different embodiments, the gate electrodes 220 may be disposed in a metal layer either above or below the metal layer of the source electrodes 240. In one embodiment, the display panel 302 may be referred to as a vertical alignment LCD panel as the common electrodes 270 are vertically separated from the subpixel electrodes 350. Further, the substrate 310 may be a glass substrate or a plastic substrate.

In one embodiment, the display panel 302 may include receiver electrodes 370. In the embodiment of FIG. 3, the receiver electrodes 370 are disposed on the lens 360. In other embodiments, the receiver electrodes may be disposed on a substrate attached to the lens 360, or on any other layer of the display panel 302 between the common electrodes 270 and the lens 360.

FIG. 4 is an example partial side view of a display panel 402, according to one or more embodiments. In one embodiment, the display panel 402 includes a substrate 310, the gate electrodes 220, the source electrodes 240, the subpixels electrodes 350, the common electrodes 270, the traces 272, liquid crystal material 340, and the lens 360. Further, the display panel 402 may include a color filter glass 365, one or more polarizers, and other display layers not illustrated. In one embodiment, the gate electrodes 220, the source electrodes 240, and the traces 272 may be disposed within different metal layers, and the position of those metal layers may differ from what is shown in the embodiment of FIG. 4. For example, in different embodiments, the gate electrodes 220 may be disposed in a metal layer either above or below the metal layer comprising the source electrodes 240. In one or more embodiments, the display panel 402 may be referred to as an in-plane switching or fringe field switching LCD panel as the common electrodes 270 are horizontally separated from the subpixel electrodes 350. In one embodiment, the common electrodes 270 are vertically separated from the electrodes of the subpixels 250 in addition to being horizontally separated from the electrodes of the subpixels 250. Further, the display panel 202 of FIG. 4 may include receiver electrodes 370 disposed on any layer separated from the common electrodes 270.

Figure 5:
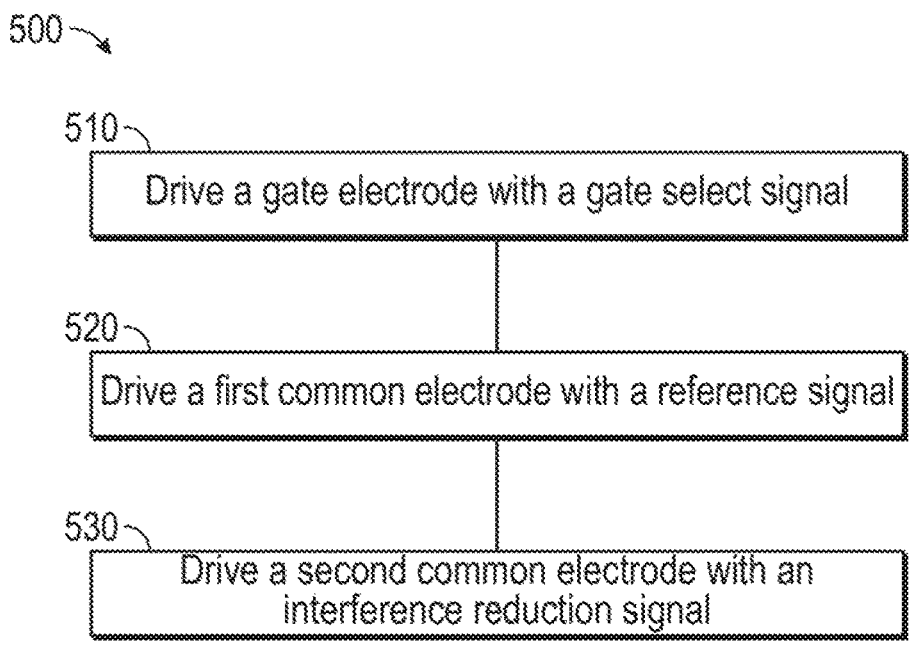
FIG. 5 illustrates a method for reducing interference emitted by a display device, according to one or more embodiments.

FIG. 5 illustrates method 500 for reducing interference generated by a display device, according to one or more embodiments. At operation 510, a gate electrode is driven with a gate select signal. In one embodiment, the display driver 210 communicates a control signal to the selection circuitry 230 via the selection circuitry control trace 260, instructing the selection circuitry to drive the gate electrode 220*a* with a gate select signal. For example, the display driver 210 may send a clock signal to the selection circuitry 230 and in response to the rising edges of the clock signal, the selection circuitry 230 may drive a corresponding gate electrode 220 with a gate select signal.

Figure 6A:
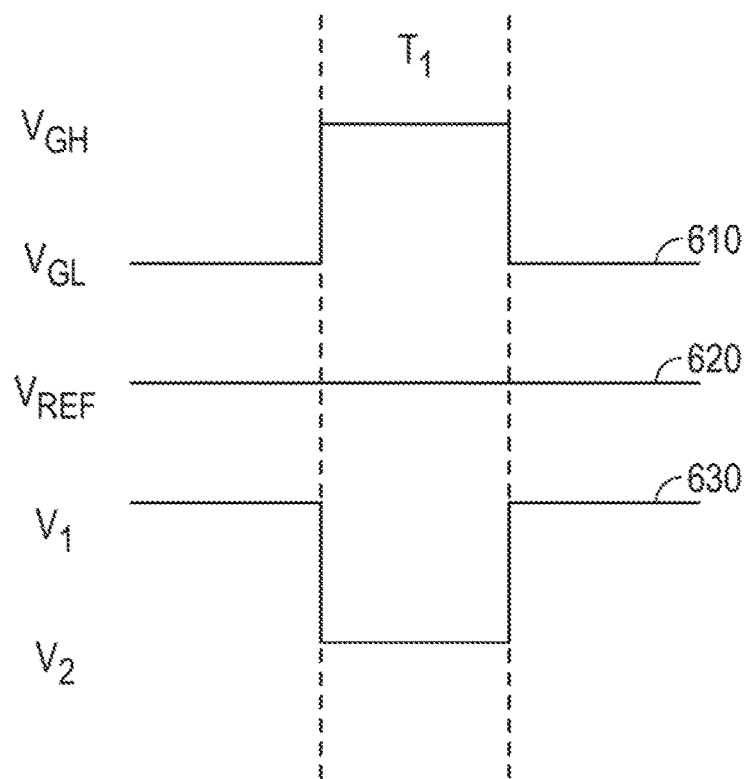
FIGS. 6A, 6B, 6C, 6D, and 6E illustrate traces of signals driven on to a display device to reduce emitted interference, according to one or more embodiments.

FIG. 6A illustrates an example gate select signal 610. In one embodiment, the gate select signal 610 transitions between $V_{GL}$ to $V_{GH}$, where driving a gate electrode with $V_{GH}$ selects the gate electrode for updating and driving a gate electrode with $V_{GL}$ deselects the gate electrode for updating during a first period. In various embodiments, $V_{GH}$ corresponds to a turn on voltage for the select transistors of the subpixels 250 and $V_{GL}$ corresponds to a turn off voltage for the transistors of the subpixels 250. In one or more embodiments, the polarity of $V_{GH}$ and $V_{GL}$ may be reversed, such that $V_{GL}$ is larger in voltage than $V_{GH}$. In one embodiment, with further reference to FIG. 6A, during time period $T_1$, the gate electrode 220*a* is driven from $V_{GL}$ to $V_{GH}$ by the selection circuitry 230 to activate the subpixels 250 coupled to the gate electrode 220*a* for display updating.

At operation 520, a first common electrode is driven with a reference signal. For example, in one embodiment, the common electrode 270*a* is driven with the reference signal 620 of FIG. 6A, during time period $T_1$. The reference signal 620 may function as a common voltage to which the subpixels 250 are referenced. In one embodiment, the reference signal may be about 5 V. In other embodiment, the reference signal may be less than 5 V or greater than 5 V.

In one embodiment, the voltage difference between a voltage on the electrodes of the activated subpixels 250 and the voltage on the common electrode 270*a* controls the parameters of the liquid crystal material (e.g., liquid crystal material 340), controlling the amount of light emitted by (or the brightness of) each activated subpixel 250.

In one or more embodiments, more than one common electrode 270 may be driven with the reference signal during time period $T_1$. For example, with reference to FIGS. 2A and 2B, one or more of common electrodes 270*b* and 270*c* may be driven with the reference signal during time period T1. Further, each common electrode 270*a* that is disposed adjacent to the one or more subpixels 250 coupled to the gate electrode 220*a* may be driven with the reference signal. For example, the common electrodes 270*a*, 270*e*, and 270*i* may be driven by the display driver circuitry 214 with the reference signal for display updating.

At operation 530, a second common electrode is driven with an interference reduction signal. For example, as illustrated in FIG. 6A, the common electrode 270*d* may be driven with the interference reduction signal 630, during the first period. The interference reduction signal 630 may be opposite in polarity from that of the gate select signal 610. For example, when the gate select signal 610 transitions from $V_{GL}$ to $V_{GH}$ the interference reduction signal transitions from voltage $V_1$ to voltage $V_2$, where the voltage value of the voltage $V_1$ is larger than the voltage value of the voltage $V_2$. Further, when the gate select signal transitions from $V_{GH}$ to $V_{GL}$, the interference reduction signal transitions from the voltage $V_2$, to the voltage $V_1$. The voltages $V_1$ and $V_2$ may be based on $V_{GH}$ and $V_{GL}$, respectively. For example, in one embodiment, the voltage $V_1$ may be the same as $V_{GH}$ and V2 may be the same as $V_{GL}$. In other embodiments, the value of the voltage $V_1$ may be a percentage of the value of $V_{GH}$, and the value of the voltage $V_2$ is a percentage of the value of $V_{GL}$. For example, the value of the voltage $V_1$ may be less than 100% of the value of $V_{GH}$, and the value of the voltage $V_2$ may be less than 100% of the value of $V_{GL}$.

In one or more embodiments, the voltage $V_1$ differs from $V_{GH}$ and the voltage $V_2$ differs from $V_{GL}$. Further, the peak-to-peak amplitude of the gate select signal 610 may be the same as or different from the peak-to-peak amplitude of the interference reduction signal 630. For example, the difference between $V_{GH}$ and $V_{GL}$ may be the same as or different from the difference between voltage $V_1$ and voltage $V_2$.

In one embodiment, by varying the difference between the voltage $V_1$ and the voltage $V_2$ the amount of interference that is mitigated may be varied. For example, if the difference between the voltage $V_1$ and the voltage $V_2$ is similar to that of $V_{GH}$ and $V_{GL}$, more interference may mitigated than if the difference between the voltage $V_1$ and the voltage $V_2$ is less than that of $V_{GH}$ and $V_{GL}$.

The gate electrode 220a may be driven with a gate select signal, the common electrode 270a may be driven with a reference signal, and the common electrode 270d may be driven with an interference reduction signal during an overlapping period of time. Further, the gate electrode 220c may be driven with a gate select signal, the common electrode 270b may be driven with a reference signal, and the common electrode 270d may be driven with an interference reduction signal during a second period, different than the first period. In one embodiment, the common electrode 270b may be driven with one of the reference signal and an interference reduction signal during the first period. Further, the common electrode 270a may be driven with one of the reference signal, and an interference reduction signal during the second period. In one embodiment, each of the common electrodes 270 along a common gate electrode 220 may be simultaneously driven with a common interference reduction signal. For example, the gate electrode 220a may be selected for updating and common electrodes 270a, 270e and 270i may be driven with the reference signal 620 and common electrodes 270d, 270h, and 270l may be driven with the interference reduction signal 630.

Figure 6B:
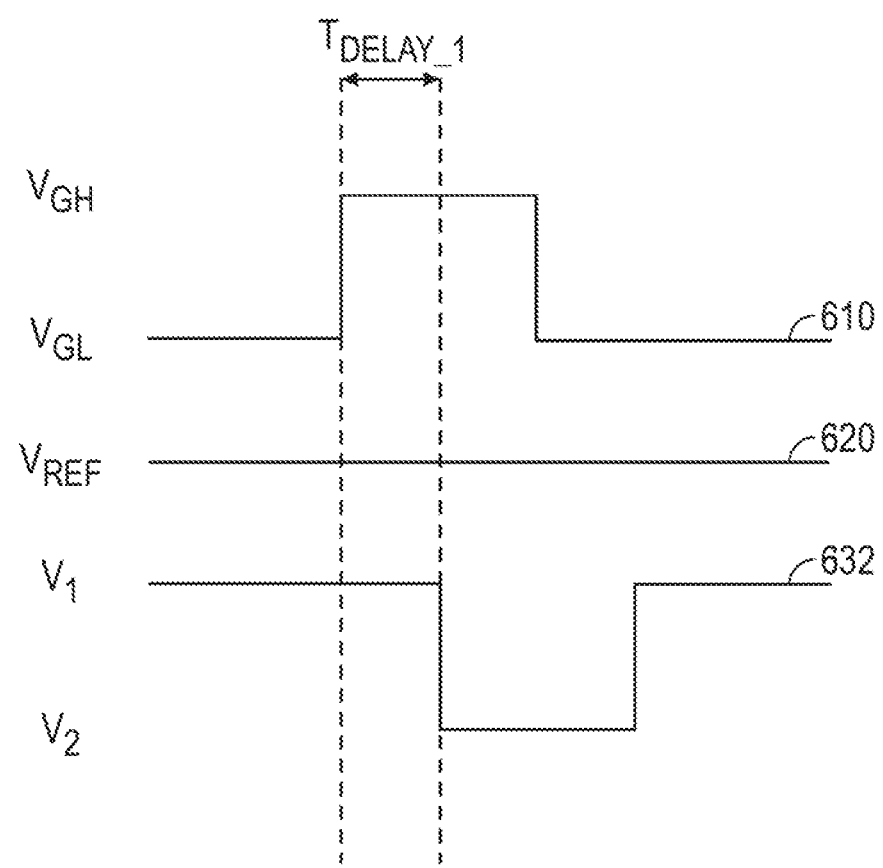

In the embodiment of FIG. 6B, the common electrode 270d may be driven with an interference reduction signal 632, where the interference reduction signal 632 includes a phase delay, $T_{DELAY1}$. The amount of delay introduced by the phase delay $T_{DELAY1}$ may correspond to a difference in the RC time constant of the common electrode 270d and any corresponding traces and the RC time constant of the gate electrode 220a and any corresponding traces. In one embodiment, delaying the interference reduction signal 632 by the phase delay $T_{DELAY1}$ synchronizes the interference reduction signal 632 with the gate select signal 610. For example, delaying the interference reduction signal 632 by the phase delay $T_{DELAY1}$ ensures that the interference reduction signal 632 is driven onto a common electrode 270 during an overlapping period with when the gate select signal 610 is driven on a gate electrode 220. The difference between when the gate select signal 610 is driven on a gate electrode 220 and when the interference reduction signal 632 is driven on a common electrode 270 may be due to a RC time constant difference between the gate electrode 220 and the common electrode 270. In various embodiments, each of the interference reduction signals driven onto each common electrode 270 may have the same phase delay, or one or more of the interference reduction signals may have a phase delay that differs from another one or more of the interference reduction signals.

Figure 6C:
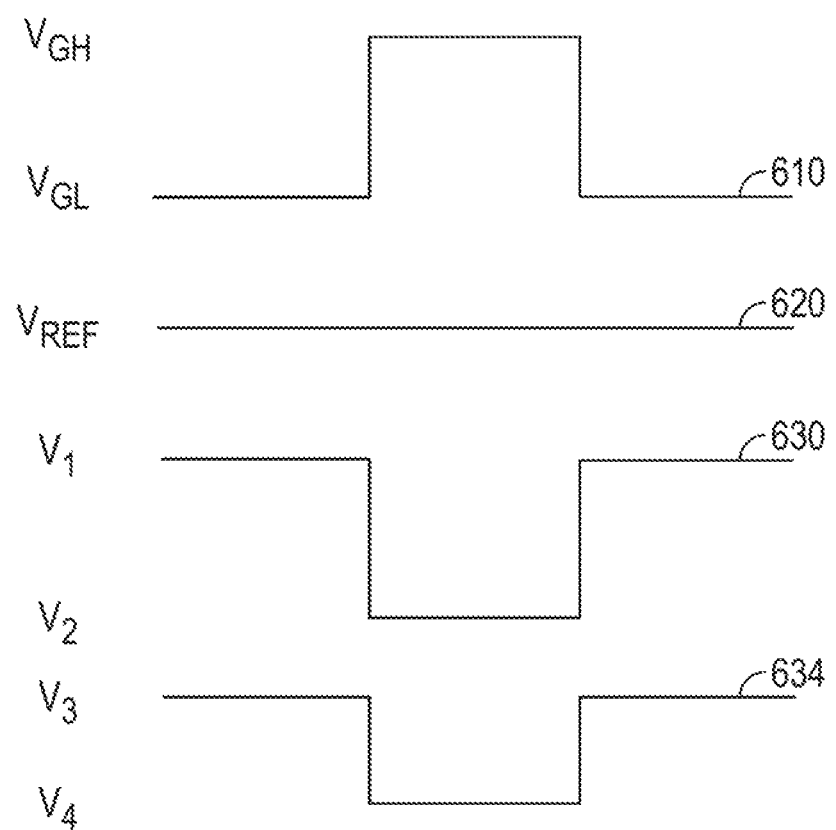

In one or more embodiments, the interference reduction signals driven on different ones of the common electrodes 270 may differ in peak-to-peak amplitude. For example, as illustrated in the embodiment of FIG. 6C, the interference reduction signals 630, 634 differ in peak-to-peak amplitude. In one embodiment, the interference reduction signal 630 transitions between the voltage $V_1$ and the voltage $V_2$ and interference reduction signal 634 transitions between voltage $V_3$ and voltage $V_4$. In one embodiment, the difference between the voltage $V_3$ and the voltage $V_4$ differs from the difference between the voltage $V_1$ and the voltage $V_2$. In one embodiment, the absolute value of the voltage $V_3$ may be less than the absolute value of the voltage $V_1$. Further, the absolute value of the voltage $V_4$ may differ from the absolute value of the voltage $V_2$.

Figure 6D:
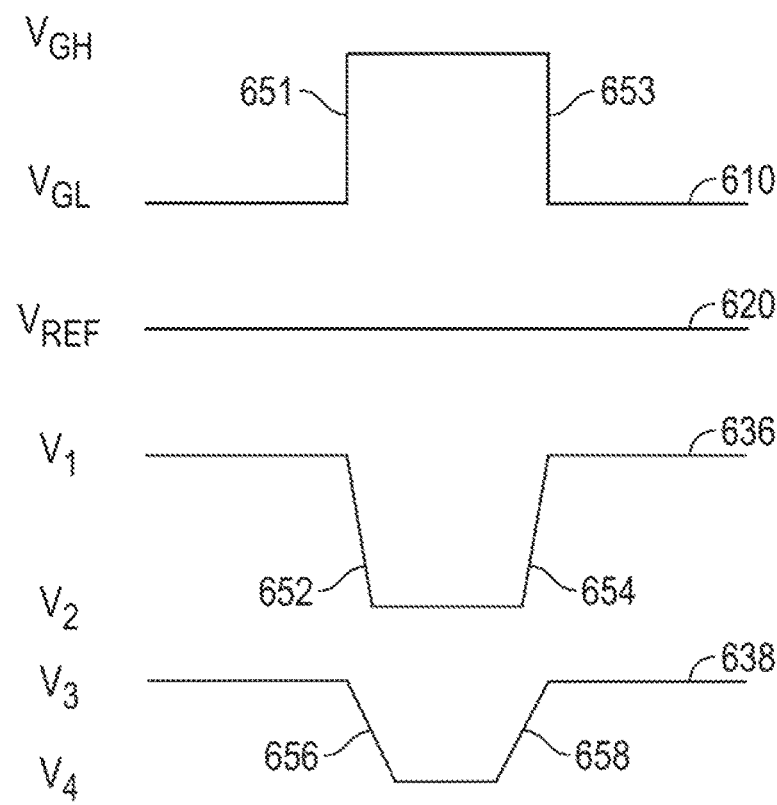

FIG. 6D illustrates an embodiment of the interference reduction signals, where the interference reduction signals differ in shape. For example, the interference reduction signals 636, 638 differ in shape. In one embodiment, one or more of the fall and rise times 652, 654 of the interference reduction signal 636 differs from one or more of the fall and rise times 656, 658 of the interference reduction signal 638. In one embodiment, both of the fall and rise times 652, 654 differ from the fall and rise times 656, 658.

In one or more embodiments, the fall time 652 may be less than the fall time 656. Further, the rise time 654 may be less than the rise time 658. Alternatively, the fall time 656 may be less than the fall time 652, and the rise time 658 may be less than the rise time 654. In one embodiment, the fall time 652 is less than the fall time 656 and the rise time 658 is less than the rise time 654. Alternatively, the fall time 656 may be less than the fall time 652 and the rise time 654 may be less than the rise time 658. In one or more embodiments, the shape of the interference reduction signals may be varied in other ways in addition to or alternatively to varying the rise and/or falls times as illustrated in FIG. 6D.

Further, one or more of the rise and fall times 654, 652 of the interference reduction signal 636 and the rise and fall times 658, 656 of the interference reduction signal 638 may differ from the rise and fall times 651 and 653 of the gate select signal 610. In one or more embodiments, one or more of the rise and fall times 654, 652 of the interference reduction signal 636 may differ from respective ones of the rise and fall times 651, 653 of the gate select signal 610. Further, one or more of the rise and fall times 658, 656 of the interference reduction signal 638 may differ from respective ones of the rise and fall times 651, 653 of the gate select signal 610.

In various embodiments, the voltage transition driven on the interference reduction signals 636 and 638 may differ. For example, as is described with regard to the interference reduction signal 636 may differ from the interference reduction signal 638 in peak-to-peak amplitude, voltage values, and/or shape.

Further, in one or more embodiments, one or more of the interference reduction signals 636 and 638 may be delayed by a phase delay. For example, both of the interference reduction signals 636 and 638 may be delayed by a common phase delay or by different phase delays. Further, only one of the interference reduction signals 636 and 638 may be delayed by a phase delay.

Figure 6E:
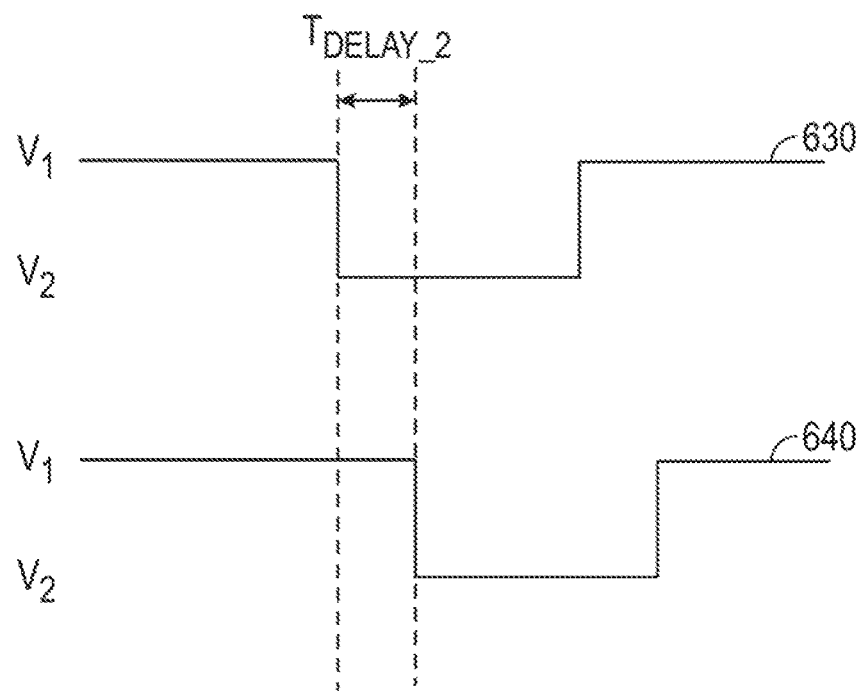

FIG. 6E illustrates interference reduction signals 630, 640, according to one or more embodiments. As illustrated in the embodiment of FIG. 6E, one or more interference reduction signals may be delayed as compared to another interference reduction signal to adjust for differences in RC time constants between the common electrodes. For example, the interference reduction signal 640 may be delayed as compared to the interference reduction signal 630 by a phase delay $T_{DELAY2}$, as the RC time constant of the common electrode 270 driven with the interference reduction signal 640 is larger than the RC time constant of the common electrode 270 driven with the interference reduction signal 630. In one embodiment, the RC time constants may vary as the trace connecting the common electrode 270a to the display driver 210 is longer than the trace connecting the common electrode 270d to the display driver 210, resulting in the traces and the corresponding common electrodes differing in resistance. In one or more embodiments, the phase delay may be the same for one or more common electrodes 270, or the phase delay may differ between two or more of the common electrodes 270.

The phase delays of display device 200 may be determined by measuring the RC time constants of the display device 200. The measured RC time constants may be used to calculate a phase delay for each of the common electrodes 270. In one embodiment, the RC time constants for each display device 200 may be measured by the display driver 210, and used to calculate the phase delay for each common electrode 270 of the display device 200. In other embodiments, the RC time constants may be determined based on modeled parameters of the display device 200. For example, the RC time constants may be determined based on the type of material used for the traces 272 and the common electrodes 270, the length of the traces and/or the width of the traces. The RC time constants may then be used to determine the phase delay for each common electrode 270.

In one embodiment, the level of interference mitigation, e.g., the amount by which the interference is reduced, may be adjusted by varying the number of common electrodes 270 driven with the interference reduction signal, varying the voltage values of the interference reduction signals, varying the peak-to-peak amplitude, and/or by varying the distance of the common electrode driven with the interference reduction signal and the gate electrode 220 driven with the gate select signal. For example, the amount of which interference may be reduced may be increased by at least one of increasing the number of common electrodes 270 driven with the interference reduction signal, increasing the peak-to-peak amplitude of the interference reduction signal, and decreasing the distance between the common electrodes 270 driven with the interference reduction signal and the selected gate electrode.

In one embodiment, the peak-to-peak amplitude of the interference reduction signals may correspond to a distance between the common electrodes 270 on which the interference reduction signals are driven and the gate electrode 220 selected for display updating. For example, the voltage values of the interference reduction signals may be increased as the distance between the common electrode 270 and the selected gate electrode 220 increases. Further, in one embodiment, the voltage values of the interference reduction signals may correspond to the number of common electrodes 270 that are driven with the interference reduction signal. For example, interference reduction signals having a smaller peak-to-peak amplitude may be utilized in embodiments where a larger number of common electrodes 270 are driven with the interference reduction signal. In one embodiment, the peak-to-peak amplitude of the interference reduction signals utilized in embodiments where more than two common electrodes 270 are driven with the interference reduction signals may be smaller than the peak-to-peak amplitude of the interference reduction signals utilized in embodiments where one common electrode 270 is driven with the interference reduction signal.

In one embodiment, the distance between the gate electrode 220 driven with the gate select signal (e.g., gate select signal 610) and the common electrode 270 driven with the interference reduction signal (e.g., interference reduction signal 630) may be set such that the interference reduction signal driven on the common electrode 270 does not negatively impact updating the subpixels 250 coupled to the selected gate electrode 220. For example, the distance between the selected gate electrode and the common electrode driven with the interference reduction signal may be equal to at least one display line. Further, the distance between the selected gate electrode and the common electrode driven with the interference reduction signal may be equal to at least one common electrode 270. In one embodiment, the distance between the gate electrode 220 selected for updating and the common electrode driven with the interference reduction signal may correspond to the values of the voltage $V_1$ and the voltage $V_2$. For example, as the voltage difference between the voltage $V_1$ and the voltage $V_2$ of the interference reduction signal increases, the distance between the gate electrode 220 selected for updating and the common electrode 270 driven with the interference reduction signal may also increase.

In one embodiment, one or more the common electrodes 270 are electrically floated. For example, one or more of the common electrodes may be driven with high impedance (HiZ). In one or more embodiments, with reference to FIGS. 2A and 2B, common electrode 270b may be driven with the reference signal 620 and the common electrode 270c may be electrically floated. Further, with reference to FIGS. 2C and 2D, the common electrodes 270b, 270f, and 270j may be driven with the reference signal 620 and the common electrodes 270c, 270g, and 270k may be electrically floated.

In one or more embodiments, a first one or more of the common electrodes 270 may be driven with a first reference signal having a first voltage value and a second one or more of the common electrodes 270 may be driven with a second reference signal having a second voltage value. The first voltage may be the same as or different from the second voltage. Further, both of the first and second reference signals may be direct current (DC) signals.

In various embodiments, one or more common electrodes 270 may be driven with an interference reduction signal for various different display line update periods. For example, with reference to FIG. 6A, the common electrode 270d may be driven with the interference reduction signal 630 during the periods when each of the gate electrodes 220a-220d is selected for updating.

FIG. 7 illustrates a method 700 for reducing interference generated by a display device, according to one or more embodiments. At operation 710, a selection circuitry control trace is driven with a control signal. In one embodiment, the control circuitry 212 of the display driver 210 communicates a control signal to the selection circuitry 230 via the selection circuitry control trace 260 to instruct the selection circuitry 230 to drive the gate electrode 220a with a gate select signal. The control signal may be a clock signal, having one or more pulses. Each pulse may correspond to a voltage transition from a first voltage to a second voltage and then from the second voltage to the first voltage.

FIG. 8 illustrates an example pulse (e.g., voltage transition) of a control signal 810. As is illustrated in the embodiment of FIG. 8, the pulse of the control signal 810 transitions from voltage $V_6$ to voltage $V_5$ and then from voltage $V_5$ to voltage $V_6$. In one embodiment, in response to the rising edges of the clock signal, the selection circuitry 230 may drive a corresponding gate electrode 220 with a gate select signal, to select the gate electrode for display updating.

At operation 720, an interference reduction trace is driven with an interference reduction signal. In one or more embodiments, the interference reduction trace 262 is driven with an interference reduction signal 820. The interference reduction signal 820 may differ in polarity from the control signal 810. For example, as is illustrated in FIG. 8, while the control signal 810 includes a positive voltage transition, the interference reduction signal 820 includes a negative voltage transition transitioning from voltage $V_7$ to voltage $V_8$, and then from voltage $V_8$ to voltage $V_7$, where the value of the voltage $V_7$ is greater than the value of the voltage $V_8$. In another embodiment, when the control signal 810 includes a negative transition, transitioning from the voltage $V_5$ to the voltage $V_6$ and then from the voltage $V_6$ to the voltage $V_5$, the interference reduction signal 820 includes a positive transition, transitioning from the voltage $V_8$ to the voltage $V_7$ and then from the voltage $V_7$ to the voltage $V_8$.

In one embodiment, the peak-to-peak amplitude of the interference reduction signal 820 is similar to the peak-to-peak amplitude of the control signal 810. For example, the difference between the voltage $V_5$ and the voltage $V_6$ is similar to the difference between the voltage $V_7$ and the voltage $V_8$. Further, in one embodiment, the voltage $V_5$ is similar to the voltage $V_7$, and the voltage $V_6$ is similar to the voltage $V_8$. In another embodiment, the peak-to-peak amplitude of the interference reduction signal 820 differs from the peak-to-peak amplitude of the control signal 810. For example, the difference between the voltage $V_5$ and the voltage $V_6$ may differ from to the difference between the voltage $V_7$ and the voltage $V_8$. In one embodiment, the voltage $V_5$ differs from voltage $V_7$, and/or the voltage $V_6$ differs from the voltage $V_8$.

In one embodiment, the phase of the interference reduction signal 820 is similar to the phase of the control signal 810. In another embodiment, the phase of the interference reduction signal 862 differs from the phase of the control signal 810. For example, the interference reduction signal 862 may include a phase delay.

In one embodiment, the shape of the interference reduction signal 820 is similar to the shape of the control signal 810. For example, the rise time of the interference reduction signal 820 is similar to the rise time of the control signal 810 and the fall time of the interference reduction signal 820 is similar to the fall time of the control signal 810. FIG. 8 illustrates an interference reduction signal 820 having a similar shape to the control signal 810. In another embodiment, the shape of the interference reduction signal 820 differs from the shape of the control signal 810. For example, the rise time and/or fall time of the interference reduction signal 820 may differ from the rise time and/or the fall time of the control signal 810.

In one embodiment, by varying one or more of the peak-to-peak amplitude, phase, and shape of the interference reduction signal 820 with regard to the control signal 810, the amount of interference reduced when driving the control signal 810 may be varied. For example, increasing the peak-to-peak amplitude of the interference reduction signal 820 as compared to the control signal 810 may increase the amount interference reduced.

FIG. 9 illustrates a method 900 for reducing interference generated by a display device, according to one or more embodiments. At operation 910, a MUX control trace is driven with a selection signal. For example, in one embodiment, the display driver circuitry 214 of the display driver 210 communicates a selection signal to MUXs 252 via the MUX control trace 256 to instruct the MUXs 252 to select a source electrode 240 for display updating. The selection signal may be a clock signal, having one or more pulses. Each pulse may correspond to a voltage transition from a first voltage to a second voltage and then from the second voltage to the first voltage. FIG. 10 illustrates an example pulse of the selection signal 1010. As is illustrated in the embodiment of FIG. 10, the pulse of the selection signal 1010 transitions from the voltage $V_{10}$ to the voltage $V_9$ and then from the voltage $V_9$ to the voltage $V_{10}$. In one embodiment, in response to the rising edges of the clock signal, the MUXs 252 may select a corresponding source electrode 240 for updating.

At operation 920, an interference reduction trace 258 (e.g., the interference reduction trace 258) is driven with an interference reduction signal. For example, as shown in FIG. 10, the interference reduction trace 258 may be driven with interference reduction signal 1020. The interference reduction signal 1020 may differ in polarity from the selection signal 1010. For example, as is illustrated in FIG. 10, while the selection signal 1010 includes a positive transition, the interference reduction signal 1020 includes a negative voltage transition transitioning from the voltage $V_{11}$ to the voltage $V_{12}$, and then from the voltage $V_{12}$ to the voltage $V_{11}$, where the value of the voltage $V_{11}$ is greater than the value of the voltage $V_{12}$. In another embodiment, the selection signal 1010 includes a negative transition, transitioning from the voltage $V_9$ to the voltage $V_{10}$ and then from the voltage $V_{10}$ to the voltage $V_9$, and the interference reduction signal 1020 includes a positive transition, transitioning from the voltage $V_{12}$ to the voltage $V_{11}$ and then from the voltage $V_{11}$ to the voltage $V_{12}$.

In one embodiment, the peak-to-peak amplitude of the interference reduction signal 1020 is similar to the peak-to-peak amplitude of the selection signal 1010. For example, the difference between the voltage $V_9$ and the voltage $V_{10}$ is similar to the difference between the voltage $V_{11}$ and the voltage $V_{12}$. Further, in one embodiment, the voltage $V_9$ is similar to the voltage $V_{11}$, and/or the voltage $V_{10}$ is similar to the voltage $V_{12}$. In another embodiment, the peak-to-peak amplitude of the interference reduction signal 1020 differs from the peak-to-peak amplitude of the selection signal 1010. For example, the difference between the voltage $V_9$ and the voltage $V_{10}$ may differ from the difference between the voltage $V_{11}$ and the voltage $V_{12}$. Further, in one embodiment, the voltage $V_9$ differs from the voltage $V_{11}$, and/or the voltage $V_{10}$ differs from the voltage $V_{12}$.

In one embodiment, the phase of the interference reduction signal 1020 is similar to the phase of the selection signal 1010. In another embodiment, the phase of the interference reduction signal 1020 may differ from the phase of the selection signal 1010. For example, the interference reduction signal 1020 may include a phase delay.

In one embodiment, the shape of the interference reduction signal 1020 is similar to the shape of the selection signal 1010. For example, the rise time of the interference reduction signal 1020 is similar to the rise time of the selection signal 1010 and the fall time of the interference reduction signal 1020 is similar to the fall time of the selection signal 1010. FIG. 10 illustrates the interference reduction signal 1020 having a similar shape to the selection signal 1010. In another embodiment, the shape of the interference reduction signal 1020 differs from the shape of the selection signal 1010. For example, the rise time and/or fall time of the interference reduction signal 1020 may differ from the rise time and/or the fall time of the selection signal 1010.

In one embodiment, by varying one or more of the peak-to-peak amplitude, phase and shape of the interference reduction signal 1020 with regard to the selection signal 1010, the amount of interference reduced when driving the selection signal 1010 may be varied. For example, increasing the peak-to-peak amplitude of the interference reduction signal 1020 as compared to the selection signal 1010 may increase the amount interference that is reduced.

In one or more embodiments, driving interference reduction traces with interference reduction signals reduces interference generated by corresponding display devices. Thus, the effects of interference generated by such display devices are reduced, and the number of electronic systems which may include the display devices is increased.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

What is claimed is:

1. A method for reducing electromagnetic interference of a display device, the method comprising:
    driving a first gate electrode of a plurality of gate electrodes of the display device with a first gate select signal to select first subpixels of a plurality of subpixels for updating during a first period;
    driving a first common electrode of a plurality of common electrodes with a reference signal during the first period, wherein the first common electrode is proximate the first gate electrode;
    driving a second common electrode of the plurality of common electrodes with a first interference reduction signal during the first period, the first interference reduction signal comprising a polarity opposite a polarity of the first gate select signal;
    driving a selection circuitry control trace with a control signal during a second period; and
    driving a first interference reduction trace with a second interference reduction signal during the second period, wherein a polarity of the second interference reduction signal differs from a polarity of the control signal.

2. The method of claim 1, wherein a peak-to-peak amplitude of the first gate select signal differs from a peak-to-peak amplitude of the first interference reduction signal.

3. The method of claim 1, wherein one or more of a rise time and a fall time of the first gate select signal differs from one or more of a first time and fall time of the first interference reduction signal.

4. The method of claim 1, wherein the first interference reduction signal is delayed relative to the first gate select signal.

5. The method of claim 1 further comprising:
    driving a second gate electrode of the plurality of gate electrodes with a second gate select signal to select second subpixels of the plurality of subpixels for updating during a third period;
    driving a third common electrode of the plurality of common electrodes with the reference signal during the second period, wherein the third common electrode is proximate the second gate electrode; and
    driving a fourth common electrode of the plurality of common electrodes with a third interference reduction signal during the third period, the third interference reduction signal comprising a polarity opposite a polarity of the second gate select signal.

6. The method of claim 5, wherein the first common electrode is driven with the reference signal during the third period and the second common electrode is driven with one of the first interference reduction signal and the reference signal during the third period.

7. The method of claim 6, wherein at least one of the first interference reduction signal is delayed relative to the third interference reduction signal, a peak-to-peak amplitude of the first interference reduction signal differs from a peak-to-peak amplitude of the third interference reduction signal, and a shape of the of the first interference reduction signal differs from a shape of the third interference reduction signal.

8. A method for reducing electromagnetic interference of a display device, the method comprising:
    driving a first gate electrode of a plurality of gate electrodes of the display device with a first gate select signal to select first subpixels of a plurality of subpixels for updating during a first period;
    driving a first common electrode of a plurality of common electrodes with a reference signal during the first period, wherein the first common electrode is proximate the first gate electrode;
    driving a second common electrode of the plurality of common electrodes with a first interference reduction signal during the first period, the first interference reduction signal comprising a polarity opposite a polarity of the first gate select signal;
    driving a multiplexer control trace with a selection signal during a second period; and
    driving an interference reduction trace with a second interference reduction signal during the second period, wherein a polarity of the second interference reduction signal differs from a polarity of the selection signal.

9. A display device comprising:
    a plurality of gate electrodes;
    a plurality of common electrodes;
    a plurality of subpixels coupled to the plurality of gate electrodes;
    selection circuitry configured to:
        drive a first gate electrode of the plurality of gate electrodes with a first gate select signal to select first subpixels of the plurality of subpixels for updating during a first period;
    a selection circuitry control trace coupled to the selection circuitry;
    a first interference reduction trace; and
    a display driver coupled to the selection circuitry control trace and configured to:
        drive a first common electrode of the plurality of common electrodes with a reference signal during the first period, wherein the first common electrode is proximate the first gate electrode;
        drive a second common electrode of the plurality of common electrodes with a first interference reduction signal during the first period, the first interference reduction signal comprising a polarity opposite a polarity of the first gate select signal;
        drive the selection circuitry control trace with a control signal during a second period; and
        drive the first interference reduction trace with a second interference reduction signal during the second period, wherein a polarity of the second interference reduction signal differs from a polarity of the control signal.

10. The display device of claim 9, wherein a peak-to-peak amplitude of the first gate select signal differs from a peak-to-peak amplitude of the first interference reduction signal.

11. The display device of claim 9, wherein at least one of a rise time and a fall time of the first gate select signal differs from at least one of a first time and fall time of the first interference reduction signal.

12. The display device of claim 9, wherein the first interference reduction signal is delayed relative to the first gate select signal.

13. A display device comprising:
a plurality of gate electrodes;
a plurality of common electrodes;
a plurality of subpixels coupled to the plurality of gate electrodes;
selection circuitry configured to:
drive a first gate electrode of the plurality of gate electrodes with a first gate select signal to select first subpixels of the plurality of subpixels for updating during a first period;
a plurality of source electrodes;
a multiplexer coupled to the plurality of source electrodes;
a multiplexer control trace coupled to the multiplexer; and
a second first interference reduction trace; and
a display driver configured to:
drive a first common electrode of the plurality of common electrodes with a reference signal during the first period, wherein the first common electrode is proximate the first gate electrode;
drive a second common electrode of the plurality of common electrodes with a first interference reduction signal during the first period, the first interference reduction signal comprising a polarity opposite a polarity of the first gate select signal;
drive the multiplexer control trace with a selection signal during a second period; and
drive the first interference reduction trace with a second interference reduction signal during the second period, wherein a polarity of the second interference reduction signal differs from a polarity of the selection signal.

14. A display driver for a display device, the display driver comprising:
control circuitry configured to output a control signal to instruct selection circuitry to drive a first gate electrode of a plurality of gate electrodes of the display device with a first gate select signal to select first subpixels of the display device for updating during a first period; and
display driver circuitry configured to:
drive a first common electrode of a plurality of common electrodes of the display device with a reference signal during the first period, wherein the first common electrode is proximate the first gate electrode;
drive a second common electrode of the plurality of common electrodes with a first interference reduction signal during the first period, the first interference reduction signal comprising a polarity opposite a polarity of the first gate select signal;
drive a selection signal on a multiplexer control trace during a second period to control a multiplexer; and
drive a second interference reduction signal on a first interference reduction trace during the second period.

15. The display driver of claim 14, wherein a peak-to-peak amplitude of the first gate select signal differs from a peak-to-peak amplitude of the first interference reduction signal.

16. The display driver of claim 14, wherein at least one of the first interference reduction signal is delayed relative to the first gate select signal and at least one of a rise time and a fall time of the first gate select signal differs from at least one of a first time and fall time of the first interference reduction signal.

17. The display driver of claim 14, wherein outputting the control signal to instruct the selection circuitry comprises driving the control signal onto a selection circuitry control trace, and wherein the control circuitry is further configured to drive a third interference reduction signal on second interference reduction trace.

* * * * *

UNITED STATES PATENT AND TRADEMARK OFFICE
CERTIFICATE OF CORRECTION

PATENT NO. : 10,852,887 B2
APPLICATION NO. : 16/266492
DATED : December 1, 2020
INVENTOR(S) : Petr Shepelev, Tetsuo Tanemura and Takayuki Noto It is certified that error appears in the above-identified patent and that said Letters Patent is hereby corrected as shown below:

In the Claims

Claim 7, Column 20 Line 6, delete "of the of the" and insert -- of the --, therefor.

Claim 13, Column 21 Line 21, before "first" delete "second".

Signed and Sealed this
Twelfth Day of January, 2021

Andrei Iancu
*Director of the United States Patent and Trademark Office*